July 21, 1931.   H. J. L. FRANK   1,815,840
WIRING TROUGH FLANGE
Filed Nov. 25, 1929
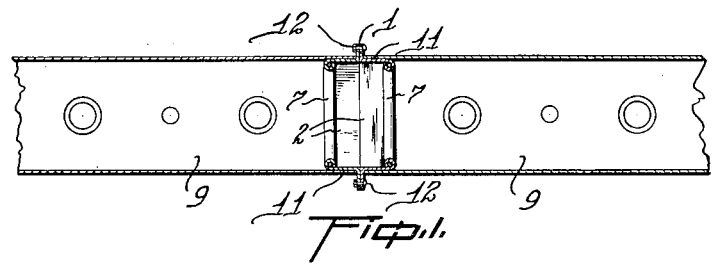
Fig. 1.
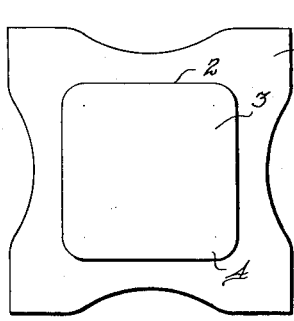 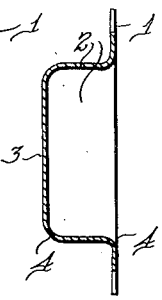 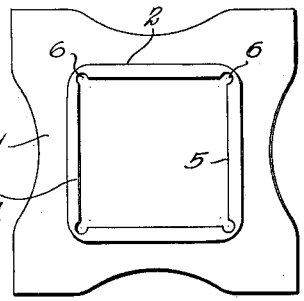 
Fig. 2.   Fig. 3.   Fig. 4.   Fig. 5.
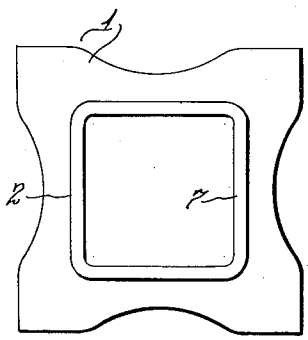 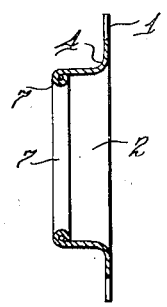 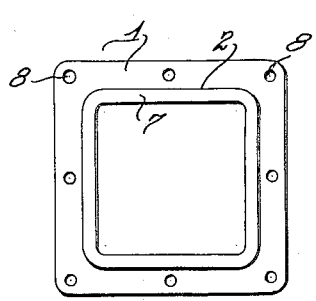 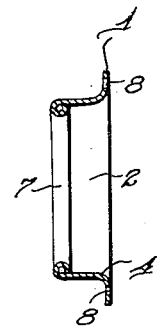
Fig. 6.   Fig. 7.   Fig. 8.   Fig. 9.
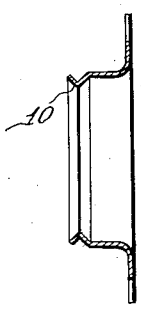
Fig. 10.
INVENTOR
*Harrison J. L. Frank*
BY
ATTORNEYS Patented July 21, 1931

1,815,840

UNITED STATES PATENT OFFICE

HARRISON J. L. FRANK, OF DETROIT, MICHIGAN, ASSIGNOR TO BULL DOG ELECTRIC PRODUCTS COMPANY, OF DETROIT, MICHIGAN, A CORPORATION OF WEST VIRGINIA

WIRING TROUGH FLANGE

Application filed November 25, 1929. Serial No. 409,525.

The present invention pertains to a novel wiring trough or conduit flange and the method of making the same.

The primary object of the present invention is to devise a flange which is adapted to be welded to the ends of enclosed metal conduits or troughs of the type used for protecting electric wires or cables. The troughs or conduits provide ample protection for the wiring and leaves them readily accessible so that tapping or splicing or other changes may be made to the wiring or new cables run through in the quickest and easiest manner, the only problem being the reinforcing of the sections and the joining of the section ends together. This problem stimulated the design of the present device which is provided with beaded walls which lend additional strength to the walls of the trough and which expose a smooth surface and avoid damaging the wires and cables, as well as being provided with a flange to accommodate bolts or rivets by which the sections of trough may be rigidly secured, one to another in end to end relation.

Another object of the present invention is to provide a system or method of making wiring trough connecting flanges, which system permits progressive manufacture and eliminates several operations and handlings which were heretofore considered necessary by previously devised systems or methods. The present system permits a greater degree of economy in the cost of manufacturing and at the same time, produces a greatly improved and more efficient article for the purpose to which it is adapted.

With the above and other ends in view, the invention consists in the matters hereinafter set forth and more particularly pointed out in the appended claims, reference being had to the accompanying drawings, in which—

Figure 1 is a cross sectional plan through a metal trough or raceway, illustrating the manner in which the present device is employed for assembling sections of trough together;

Fig. 2 is a face view of the sheet metal blank after the completion of the first operation in which a dishlike portion of substantially rectangular outline is formed on the blank;

Fig. 3 is a transverse cross section through the blank as illustrated in Fig. 2;

Fig. 4 is a face view of the sheet metal blank after the completion of the second operation in which the bottom is punched out of the dishlike portion;

Fig. 5 is a transverse cross section through the blank as illustrated in Fig. 4;

Fig. 6 is a face of the blank after the completion of the third operation in which it is crimped to form a protective and reinforcing beading on the side walls of the dishlike portion;

Fig. 7 is a transverse cross section through the blank as illustrated in Fig. 6;

Fig. 8 is a face view of the finished product at the completion of the fourth operation which consists in trimming the blank and punching bolt holes;

Fig. 9 is a transverse cross section through the blank as illustrated in Fig. 1, and Fig. 10 is a transverse cross section through a blank formed by a modified method or system of manufacture.

Like characters are employed throughout to designate the corresponding parts.

The first operation in the method of forming the present device is to place a sheet metal blank 1 in a drawing or forming press and dish it to form the walls 2 which extend at right angles to the face of the blank and the wall 3 which naturally results by the formation of the aforesaid walls. In drawing the several walls, the angles formed by the meeting thereof are rounded or curved as indicated by the numeral 4.

The second operation consists in placing the dished blank in a punch press and punching out a rectangular portion in the wall 3 to form a rectangular opening 5. The sides of the rectangular opening extend at right angles to one another and the corners or angles formed thereby are punched out and rounded as indicated by the numeral 6.

The third operation comprises placing the punched blank into a crimping press and forming a bead 7 on the outer ends of the walls 2 and the blank is then trimmed as illustrated in Fig. 8. The trimming comprises the fourth and last operation, screw or bolt holes 8 being punched through the blank during the trimming.

In Fig. 1 is illustrated fragments of two sections of troughs or sheet metal tubes 9 in connection with which the present device is used for the purpose of joining the adjacent ends of the two sections together. The walls 2 are welded as at 11 to the inner face of the walls of the trough or tube section and the face of the blank 1 projects outwardly to provide flanges through the holes 8 in which bolts 12 are passed to secure the two sections together.

The beading 7 provides protection for the electric wires or cables in the trough by eliminating rough or jagged edges at the inside of the joint of the two sections. The beading also increases the strength of the article whereby the walls of the trough are reinforced and likelihood of collapsing or bending is avoided.

The blank illustrated in Fig. 10 is drawn dishlike or described in operation number one and is then crimped inwardly as at 10 and the bottom of the dishlike portion removed. In this manner an inwardly projecting portion is formed adjacent the end of the side walls, the projecting crimped portion being either rounded or angular to answer the same purpose as the raised beading in the preferred embodiment of my invention.

Although specific embodiments of my invention and the method of making the same has been illustrated and described, it will be understood that changes may be made within the scope of the appended claims without departing from the spirit of the invention and such changes are contemplated.

What I claim is:—

1. The combination with sections of sheet metal wiring trough, of members formed of sheet metal and welded within the adjacent end portions of said sections and extending a short distance therein from the ends thereof, and flanges on said members to extend outwardly beyond the surfaces of said sections between the ends thereof and provided with openings to receive bolts for securing said sections together.

2. The combination with sections of wiring trough, of sheet metal members welded within the ends of said sections and extending a short distance within said ends, the end edges of said members within said sections being formed with a bead, and flanges on the adjacent ends of said members to extend outwardly between adjacent section ends and formed with openings to receive bolts for securing the sections together in end to end relation.

3. An end connection for sections of wiring trough comprising a sheet metal blank formed to provide an angularly extending wall to be secured within the end of a trough section and the remaining portion of said blank being formed to provide an outwardly extending flange for securing adjacent ends of trough sections together.

4. Means forming connecting flanges for sections of sheet metal wiring troughs, consisting of a sheet metal blank formed with a dish-like portion to provide a wall to extend into and be secured within the end of a trough section, the bottom of said dishlike portion being punched out, and the remaining edge portion of said bottom being rolled inwardly to provide a bead upon the inner edge of said wall, and the outer end of said wall being flanged outwardly to form a flange to extend outwardly at the end of said section for connecting sections together.

5. Connecting members for connecting the ends of sheet metal wiring trough sections of rectangular form in cross section and comprising a member formed of sheet metal with a wall to fit closely within and be welded to the end of a trough section, the inner edge of said wall being formed with an inturned bead and the outer end of said wall being formed with a flange extending outwardly at right angles to said wall, said flange being formed with openings to receive bolts for detachably securing together the ends of sections provided with said connecting members.

In testimony whereof I affix my signature.

HARRISON J. L. FRANK.